US012476861B2

(12) United States Patent
Baughman et al.

(10) Patent No.: US 12,476,861 B2
(45) Date of Patent: Nov. 18, 2025

(54) ADAPTATION OF REFERENCE ARCHITECTURE DOCUMENTS ACROSS CLOUDS

(71) Applicant: International Business Machines Corporation, Armonk, NY (US)

(72) Inventors: Aaron K. Baughman, Cary, NC (US); Jeremy R. Fox, Georgetown, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 18/235,584

(22) Filed: Aug. 18, 2023

(65) Prior Publication Data

US 2025/0062948 A1 Feb. 20, 2025

(51) Int. Cl.
*H04L 41/04* (2022.01)

(52) U.S. Cl.
CPC ................................. *H04L 41/04* (2013.01)

(58) Field of Classification Search
CPC ........................... H04L 41/04; H04L 41/0654
See application file for complete search history.

(56) References Cited

U.S. PATENT DOCUMENTS

| | | | |
|---|---|---|---|
| 9,594,622 B2 * | 3/2017 | Bohn | G06F 11/0793 |
| 10,798,109 B2 | 10/2020 | Ford | |
| 11,088,900 B2 | 8/2021 | Ratkovic et al. | |
| 11,327,680 B2 * | 5/2022 | Natanzon | G06F 3/067 |
| 11,327,826 B1 * | 5/2022 | Shama | G06N 20/00 |
| 11,556,238 B1 | 1/2023 | Kairali et al. | |
| 12,256,039 B2 * | 3/2025 | Bansal | H04M 3/2209 |

(Continued)

FOREIGN PATENT DOCUMENTS

AU 2019216649 B9 8/2021

OTHER PUBLICATIONS

Auhors et. al., "Method and System for an Auto-Evolving a Reference Architectural Document", ip.com Prior art Database Technical Disclosure, IPCOM000272227D, May 4, 2023 (Year: 2023).*

(Continued)

*Primary Examiner* — Oanh Duong
(74) *Attorney, Agent, or Firm* — Garg Law Firm, PLLC; Rakesh Garg; Gavin Giraud (57) ABSTRACT

The illustrative embodiments provide for adaptation of reference architecture documents across clouds. An embodiment includes loading a reference architecture document. The embodiment also includes populating a knowledge repository corpus where the knowledge repository corpus includes data from information technology (IT) products, cloud services, and integrations stored with associated metadata about functionalities. The IT products, the cloud services, and the integrations are stored with metadata. The embodiment also includes classifying, using an incident analysis module, the service incidents based on the reference architecture document. The embodiment also includes detecting flaws in the reference architecture document based on the classified service incidents. The embodiment also includes creating a weighted graph of the cloud services. The embodiment also includes traversing the weighted graph and creating an adapted reference architecture based on the traversed weighted graph.

20 Claims, 8 Drawing Sheets

(56) References Cited

U.S. PATENT DOCUMENTS

| | | | | |
|---|---|---|---|---|
| 2010/0312522 | A1* | 12/2010 | Laberge | G05B 23/0278 |
| | | | | 702/184 |
| 2014/0052644 | A1* | 2/2014 | Ott | G06Q 10/20 |
| | | | | 705/304 |
| 2016/0034905 | A1* | 2/2016 | Hopper | G06Q 30/016 |
| | | | | 705/304 |
| 2016/0224405 | A1* | 8/2016 | Bohn | G06F 11/0793 |
| 2020/0175395 | A1* | 6/2020 | Kathiresan | G06F 8/36 |
| 2020/0387357 | A1 | 12/2020 | Mathon et al. | |
| 2024/0097971 | A1* | 3/2024 | Harsh | H04L 41/122 |
| 2024/0195908 | A1* | 6/2024 | Bansal | H04M 3/2209 |

OTHER PUBLICATIONS

Palma et al., "Evolving Reference Architecture Description: Guidelines based on ISO/IEC/IEEE 42010", Methodological Article, Sep. 28, 2022. (Year: 2022).*

DMTF, Architecture for Managing Clouds, Jun. 18, 2010.

DoD, DoD Reference Architecture Description, Jun. 2010.

Cortes et al., Online Omni-Channel Multi-Retailer Architecture, Jun. 1, 2020.

ip.com, Method and System for Providing an Intelligent Cloud Operational Alert System, Jul. 29, 2019.

ip.com, Micro-Engagement Framework for Operations-As-A-Service, Jan. 25, 2017.

ip.com, Method of Creating a Componentized Architecture for Unifying Resource Sharing Scenarios in Cloud Computing Environment, Feb. 11, 2010.

AWS, Get Started Architecting on AWS, 2023, https://aws.amazon.com/architecture/.

Brito et al., ATMOSPHERE: Adaptive, Trustworthy, Manageable, Orchestrated, Secure, Privacy-Assuring, Hybrid Ecosystem for REsilient Cloud Computing, 2018 48th Annual IEEE/IFIP International Conference on Dependable Systems and Networks Workshops (DSN-W), Jun. 25-28, 2018.

Saay et al., A reference architecture for a national e-Learning infrastructure, UCC '16: Proceedings of the 9th International Conference on Utility and Cloud Computing, pp. 404-409, Dec. 6, 2016.

Fernandez et al., A security reference architecture for cloud systems, WICSA '14 Companion: Proceedings of the WICSA 2014 Companion vol. Article No. 3, pp. 1-5, Apr. 7, 2014.

Kolekar et al., Adaptive user interface for e-learning applications based on learning styles using Web Logs analysis: A hybrid cloud architecture, TENCON 2015—2015 IEEE Region 10 Conference, Nov. 1-4, 2015.

Duan et al., A construction method and data migration strategy for hybrid cloud storage, 2015 18th International Conference on Computer and Information Technology (ICCIT), Dec. 21-23, 2015.

Donkoh et al., A Hybrid and Adaptive Model for Predicting Register File and SRAM Power Using a Reference Design, DAC '12: Proceedings of the 49th Annual Design Automation Conference, pp. 62-67, Jun. 3, 2012.

* cited by examiner

```
import networkx as nx
G = nx.Graph()
G.add_node(1)
G.add_nodes_from([2, 3])
G.add_nodes_from([ (4, {"color": "red"}), (5, {"color": "green"}), ])
G.add_edge(1, 2)
e = (2, 3)
G.add_edge(*e)
G.add_edges_from([(1, 2), (1, 3)])
FG = nx.Graph()
FG.add_weighted_edges_from([(1, 2, 0.125), (1, 3, 0.75), (2, 4, 1.2), (3, 4, 0.375)])
for n, nbrs in FG.adj.items():
    for nbr, eattr in nbrs.items():
        wt = eattr['weight']
        if wt < 0.5: print(f"({n}, {nbr}, {wt:.3})")
G.add_edge(1, 2, weight=4.7 )
G.add_edges_from([(3, 4), (4, 5)], color='red')
G.add_edges_from([(1, 2, {'color': 'blue'}), (2, 3, {'weight': 8})])
G[1][2]['weight'] = 4.7
G.edges[3, 4]['weight'] = 4.2
```

Fig. 8

ADAPTATION OF REFERENCE ARCHITECTURE DOCUMENTS ACROSS CLOUDS

BACKGROUND

The present invention relates generally to reference architecture documents. More particularly, the present invention relates to a method, system, and computer program for adaptation of reference architecture documents across cloud systems.

A reference architecture is a document or set of documents that provides recommended structures and integrations of information technology (IT) products and services to form a solution. The reference architecture embodies accepted industry best practices, typically suggesting the optimal delivery method for specific technologies. Reference architectures can span multi-hybrid cloud services or include a single cloud service that can adjust as new services come online on different cloud services. Customer can have defined reference architecture documents; application service provider can have reference architecture documents or cloud service providers can also have reference architecture documents specific to the service provider.

SUMMARY

The illustrative embodiments provide for adaptation of reference architecture documents across clouds. An embodiment includes loading a reference architecture document. The embodiment also includes populating a knowledge repository corpus where the knowledge repository corpus includes data from information technology (IT) products, cloud services, and integrations. The IT products, the cloud services, and the integrations are stored with metadata. The embodiment also includes detecting service incidents by the different IT products. The embodiment also includes classifying, using an incident analysis module, the service incidents based on the reference architecture document. The embodiment also includes detecting flaws in the reference architecture document based on the classified service incidents. The embodiment also includes creating a weighted graph of the cloud services. The embodiment also includes traversing the weighted graph and creating an adapted reference architecture based on the traversed weighted graph. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

A reference architecture is a document or set of documents that provides recommended structures and integrations of information technology (IT) products and services to form a solution. The reference architecture embodies accepted industry best practices, typically suggesting the optimal delivery method for specific technologies. Reference architectures can span multi-hybrid cloud services or include one cloud service that can adjust as new services come online on different cloud services. Customer can have defined reference architecture documents; application service provider can have reference architecture documents or cloud service providers can also have reference architecture documents specific to the service provider.

An "incident" as referred to herein is an unplanned interruption to an IT service or reduction in the quality of an IT service.' When a system works the way it was designed to work, the service in question operates without a hitch. When something does not work in the system, it causes 'unplanned interruptions' to the service and creates an incident. The main goal of Incident Management is to provide a quick fix that resolves the interruption and restores the service to its full capacity. Examples of interruptions may include, but are not limited to, a computer not booting up correctly or the WiFi in a system not working.

A "service request" as referred to herein, is 'a formal request from a user for something to be provided. The something may include, but is not limited to, a request for information, an error to be fixed or advice. In other words, a service request is raised when a user wants to procure something that the user does not have in the first place. The user could be asking for, by non-limiting example, access to a printer or an upgrade to a higher version of a software.

There are various incident analysis systems currently available which can analyze an incident description and identify the types of problem, recommend solutions, etc.

However, because of the integration of many components including IT products and services, finding the root cause of a service incident and fixing the root cause is more difficult. For example, different types of service incidents can happen in any integrations layer of IT products and services or within the IT products and services. Those particular server or more services may be down and the root cause of the incident might be a bug with the services, internet of things (IoT) products or in the integration layer. Further, upgrades to the integration layer or services may be needed, due to, by non-limiting example, enhancements of the technology, cyber threats, etc. Based on the analysis of the service incident, the system should be able to discover the reference architecture document may be upgraded across multiple clouds.

The present disclosure addresses the deficiencies described above by providing a process (as well as a system, method, machine-readable medium, etc.) that analyzes reference architecture documents and incoming service incidents or other events. With the information the system is able to address flaws in the system and predict other cloud services that may work better for the reference architecture document system.

The illustrative embodiments provide for adaptation of reference architecture documents across clouds. Embodiments disclosed herein describe cloud systems and services having reference architectures where a reference architecture is a set of documents that provides recommended structures and integrations of IT products and services to provide best practices and optimal delivery of specific technologies. Reference architectures may include multi hybrid clouds or mono cloud systems that are capable of adjusting as new services come online on different clouds.

An "service incident" as referred to herein is an unplanned interruption to an IT service or a reduction in the quality of an IT service. For example, an incident may be a computer not booting up properly. An incident can also include WiFi not working in a system.

Also, a "service request" as referred to herein is a formal request from a user for something to be provided to the user. Such as, by non-limiting example, a user may request computer access, an upgrade of software, a repair, or the like.

Also, a flaw may be a problem in a reference architecture that is causing an incident. For example, applications in one cloud service may be connected in such a way that slows down the overall speed of the application in a system.

Illustrative embodiments include dynamic reference architecture correlated to service incidents across clouds. Based on the analysis of the service incidents, the root case of the service incidents, applied fixes, and the like, the system will identify if the reference architecture document of the solution should be upgraded automatically to prevent similar incidents in any new implementations of the reference architecture.

Illustrative embodiments include loading a reference architecture document into the system. The reference architecture document may include predictive aircraft maintenance solutions from multiple companies. Where monitoring and predicting changing needs in maintenance of the aircrafts can prevent airline delays and cancellations.

Illustrative embodiments include preventative evolution of the reference architecture document from contextual analysis of the reference architecture. While auto upgrading the reference architecture document based on analysis of historical incidents where the reference architecture document is used, the system will, by non-limiting example, add and remove appropriate textual descriptions, functionalities, integrations, and security with the reference architecture documents to ensure new implementations of the adapted reference architecture can mitigate and prevent reoccurrence of similar service incidents.

Illustrative embodiments include a self-service orientated architecture. The system includes analyzing service incident from different business users. In various embodiments, the business users may be new business users outside the system. In some embodiments, the business users may be users from within the system. The system will identify from which IT products and services the service requests are coming. Then the system will recommend what changes are to be made in the reference architecture document. This will allow the automated solutions to be created.

Figure 8:
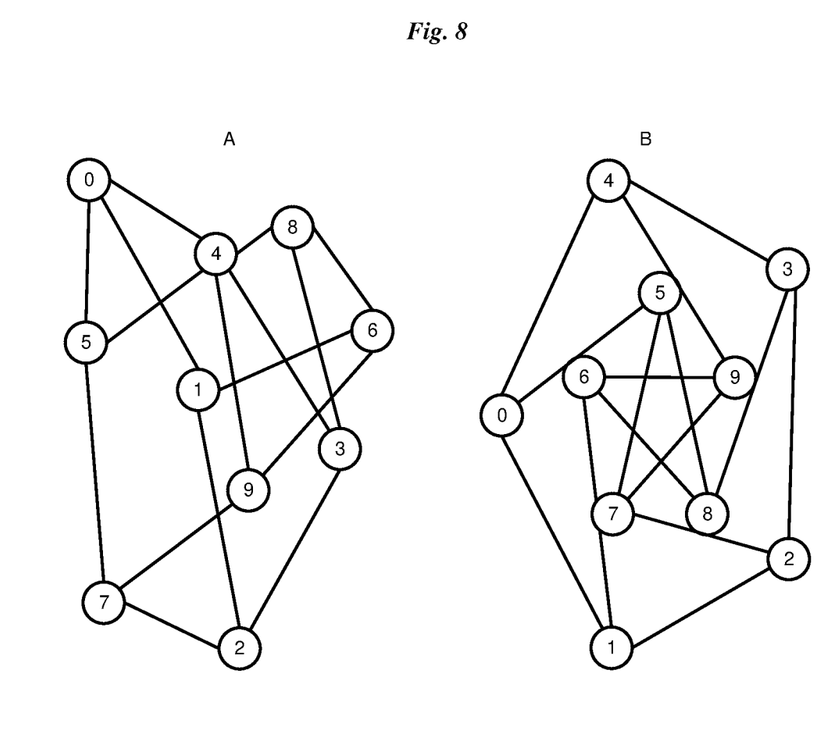
FIG. 8 depicts an example hybrid relational graph (A) and the traversal thereof (B) in accordance with an illustrative embodiment.

Illustrative embodiments also include creating a hybrid cloud relational graph. A "hybrid cloud relational graph" as referred to herein is a relational diagram with groups of nodes representing a singular cloud system connected to other cloud system nodes. Traversals of the hybrid cloud relational graph from a reference architecture service to a similar reference architecture service in another cloud may provide recommendations for service updates on a different cloud. For example, the system may determine that the reference architecture would work with less incidents in another cloud service. The system will also calculate the cost of using a different cloud service. The calculation will take into account the cost of running the reference architecture service as well as the cost when the reference architecture service is bundled with other required services. A network flow optimization algorithm will use the cost of the edge related to incidence scores where the edges are the connection points between the cloud service nodes in the graph. An example of a hybrid cloud relational graph is illustrated in FIG. 8 and will later be described in more detail.

Illustrative embodiments also include downstream evolution analysis of the adapted reference architecture diagram and associated services. For example, the system will analyze the cascading effect of the service incidents from one IT product or service to another IT product or service downstream. The system will also analyze the number of service incidents with various IT services or Internet of Things (IoT) products. Using the information from the analysis, the system will identify optimum evolution of the reference architecture diagram.

An illustrative embodiment includes loading reference architecture documents from four aircraft companies. The reference architecture documents for each company include aircraft predictive maintenance solutions. The embodiment includes populating a knowledge repository corpus. The knowledge repository corpus may include, by non-limiting example, data from IT products, cloud services, security modules, and integrations. The data will also include associated metadata about functionalities of each component. The knowledge repository may also include adding knowledge to the The illustrative embodiment includes detecting service incidents by different IT products and services in the reference architecture document. The embodiment will include classifying the service incidents that are based on the reference architecture. The embodiment classifies the service incidents using an incident analysis module. The embodiment includes detecting flaws in the reference architecture document based on the classified service incidents.

The embodiment also includes determining how the reference architecture can be adapted to improve or prevent the service incidents. The embodiment creates a weighted graph of available cloud services, using data in the knowledge repository corpus and the service incidents classified as coming from the reference architecture. The embodiment traverses the weighted graph and creates an adapted architecture document based on the traversed weighted graph.

In illustrative embodiments, the method also includes computing costs, using a network flow optimization algorithm, associated with moving the reference architecture diagram to a different cloud service. The method may also include adding operational data to the knowledge repository corpus. The method may also include receiving requests from a user to make changes to the reference architecture document. The method may also include analyzing how the changes requested by the user may affect the overall performance of the solution.

Illustrative embodiments adapt the fundamental methods of how a reference architecture document may be used in practical implementations. The methods and system described herein adapt the reference architecture document to usage of the IT products and services in a solution to provide a more functional solution.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures, therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
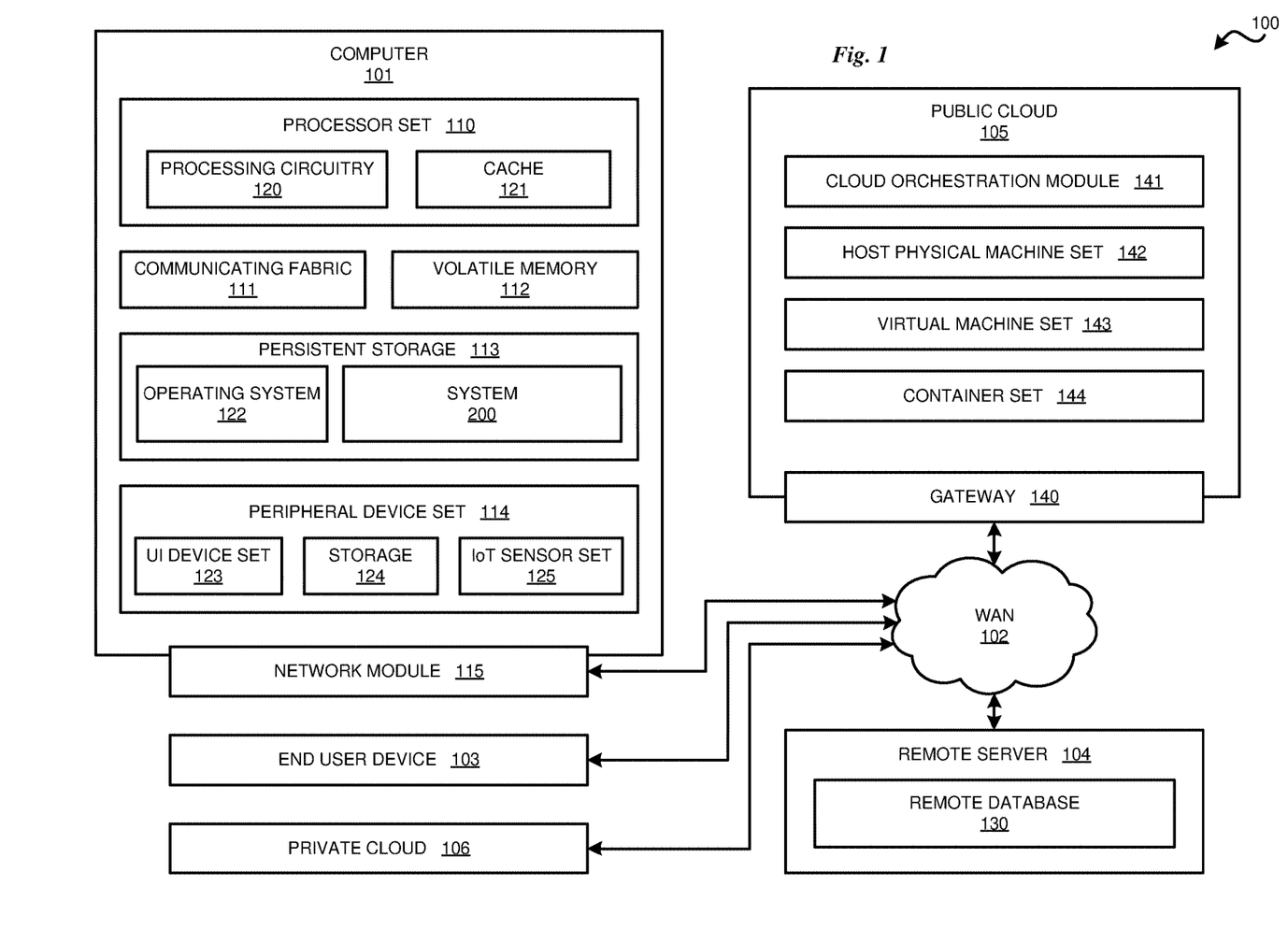
FIG. 1 depicts a block diagram of a computing environment in accordance with an illustrative embodiment.

With reference to FIG. 1, this figure depicts a block diagram of a computing environment 100. Computing environment 100 contains an example of an environment for the execution of at least some of the computer code involved in performing the inventive methods, such as an adaptation of reference architecture documents across clouds system 200 that provides adapted reference architecture documents to improve a reference architecture solution. In addition to system 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in system 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in system 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
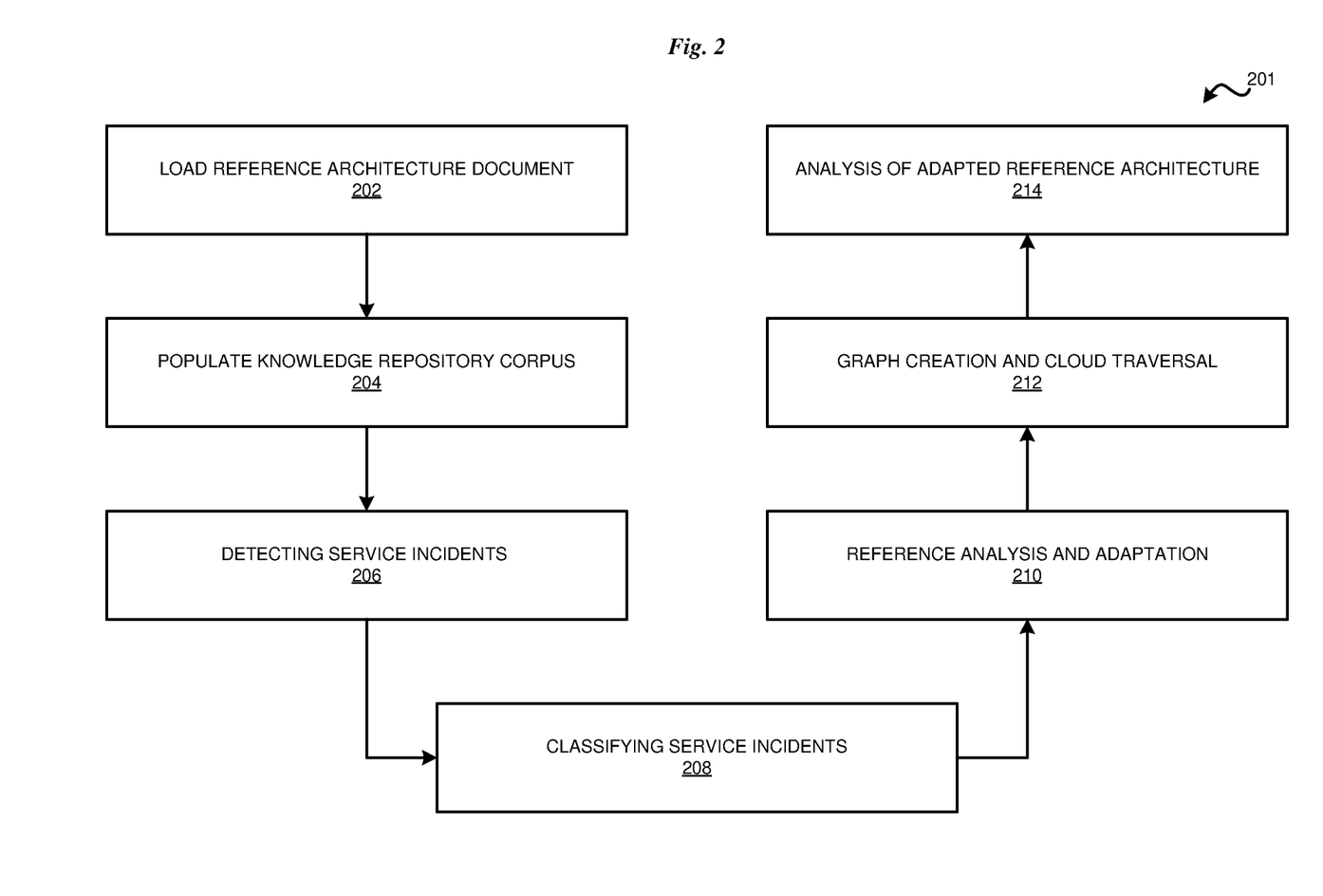
FIG. 2 depicts a flowchart of an example process for adaptation of reference architecture documents across cloud in accordance with an illustrative embodiment.

With reference to FIG. 2, this figure depicts a flow chart of example method 201 for adaptation of reference architecture documents across cloud services in accordance with an illustrative embodiment. In the illustrated embodiment, the method 201 is performed by the system 200 of FIG. 1.

In the illustrated embodiment, the method 201 provides an adapted reference architecture document to increase performance of an IT products solution. The system 200 loads a reference architecture document 202. The reference architecture document includes each and every component of the IT solution. The reference architecture document includes, and is not limited to, individual IT products, services, integration, security, etc. The reference architecture document also describes how the components in the IT solution communicate with each other.

The reference architecture document described detailed architectural implementations including what type of cloud resources are required, how the cloud resources are connected, and what the configurations of the IT products and clouds are. The reference architecture document may include different types of drawings, names of technologies, implementation steps, workflow, textual information, best practices, and other information that is important for the IT solution.

In various embodiments, the system may load more than one reference architecture document into the system. In some embodiments, the more than one reference architecture documents may be from different companies. The reference architecture document provides recommended structures and integrations of IT products and services to perform a solution to, my non-limiting example, a business, a network, or other entity that uses IT products and services to complete tasks. Reference architecture documents embodies accepted industry best practices. Reference architecture documents typically suggest the optimal delivery methods for specific technologies. In various embodiments, the reference architecture may include multiple cloud services. In other embodiments, the reference architecture may include a single cloud service.

The method also includes populating a knowledge repository corpus 204. The knowledge repository corpus may include, by non-limiting example, data from IT products, cloud services, security data and integrations stored with associated metadata about functionalities. In various embodiments, the knowledge repository corpus will initially be populated with, by non-limiting example, information on stored IT products, IT services, integrations, and security of all IT products with detailed functionalities. In various implementations, the knowledge repository corpus will also include the stored metadata which will include more attributes like name of the product, name of the service provider, latest version of the product, and other information included in metadata.

In the illustrated embodiment, the knowledge repository corpus may also include each a history of service incident that happened in the previous year in the reference architecture. The history may include, by non-limiting example, primary product involved in the service incident, any secondary products included in the service incident, service incidents that occurred with all the services in the reference architecture, business areas impacted by the service incidents, and other important information about the service incidents.

In various embodiments, the knowledge repository corpus may include details of each patch release done by the IT product and IT service providers for the last one year. The knowledge repository corpus will also include, by non-limiting example, controlling factors like version number released, which versions of the products the patches were applied to etc. The knowledge repository corpus may also include, by non-limiting example, details of the users and business units who are using any IT product or IT service for the last one year. The knowledge repository corpus may also include which service requests the users raised, which products were included and when requests were made for specific products. In various embodiments, the knowledge repository corpus will be continuously updated during operation of the business and solution of the reference architecture document.

In the illustrated embodiment, the method also includes detecting service incidents 206 by the IT products and IT services. In various embodiments, the system will constantly monitor and detect service incidents. The service incidents may have occurred in last one year by different IT products and IT services. The system will monitor in which business areas each service incident is occurring and whether the service incident included planned maintenance. The system will also monitor the number of users who are using any particular IT product or service.

In various embodiments, the system will include an image analysis and natural language processing (NLP) module. The image analysis and NLP module will analyze the reference architecture documents and will identify contextual meaning of the diagram, flow directions, and textual information. In various embodiments, the system will include an incident analysis module. The incident analysis module will analyze the service incidents descriptions. The incident analysis module will also classify service incidents 208. In various embodiments machine learning classification techniques will be used including supervised, semi-supervised and unsupervised learning. The system will follow the rule-based classification techniques using the existing knowledge repository to classify the service incidents.

In the illustrated embodiment, the method includes classifying the service incident 208 which are based on the reference architecture document using the incident analysis module. In various embodiments, the incident analysis module may identify different types of events and service incidents occurring with IT products and IT services based on the reference architecture document.

In the illustrated embodiment, the system will analyze and detect flaws in the reference architecture document based on the classified service incidents. The classified service incidents are incidents that the system analyzed and classified as coming from the architecture of the solution and not from the individual IT products and services. The system will be analyzing the root cause, the root cause action (RCA), the details of fixing the incidents. The system will classify the incidents that are related to an architectural issue. In various embodiments, the system will identify what types of fixes and changes may be applied to fix the architectural related incidents. The system will also be identifying the solutions that may be applied. The system will also use the knowledge repository corpus to identify which cloud services may be able to solve the problem causing the incidents.

Figure 5:
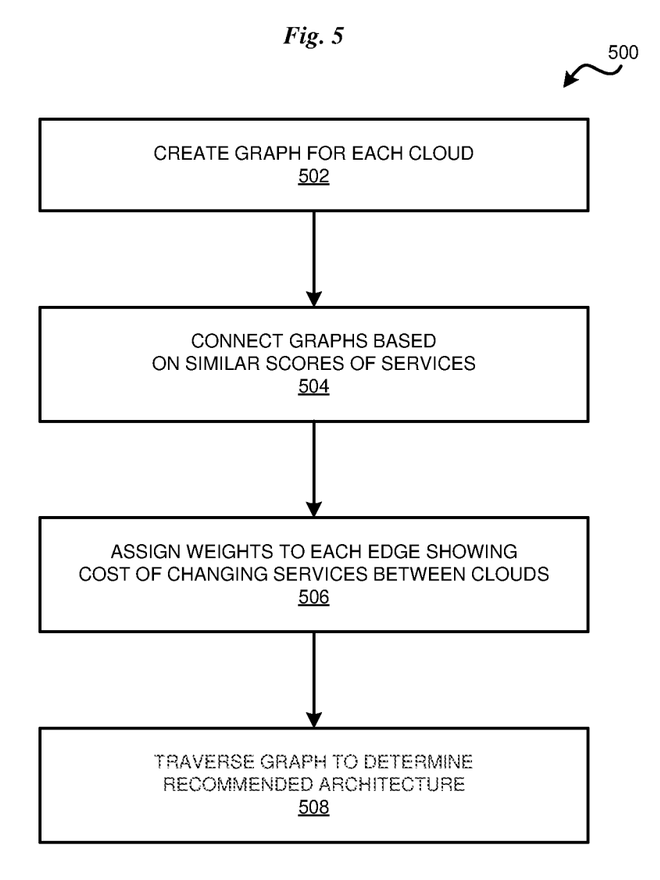
FIG. 5 depicts a flowchart of an example process for graph creation and traversal between cloud services in accordance with an illustrative embodiment.
Figure 7:
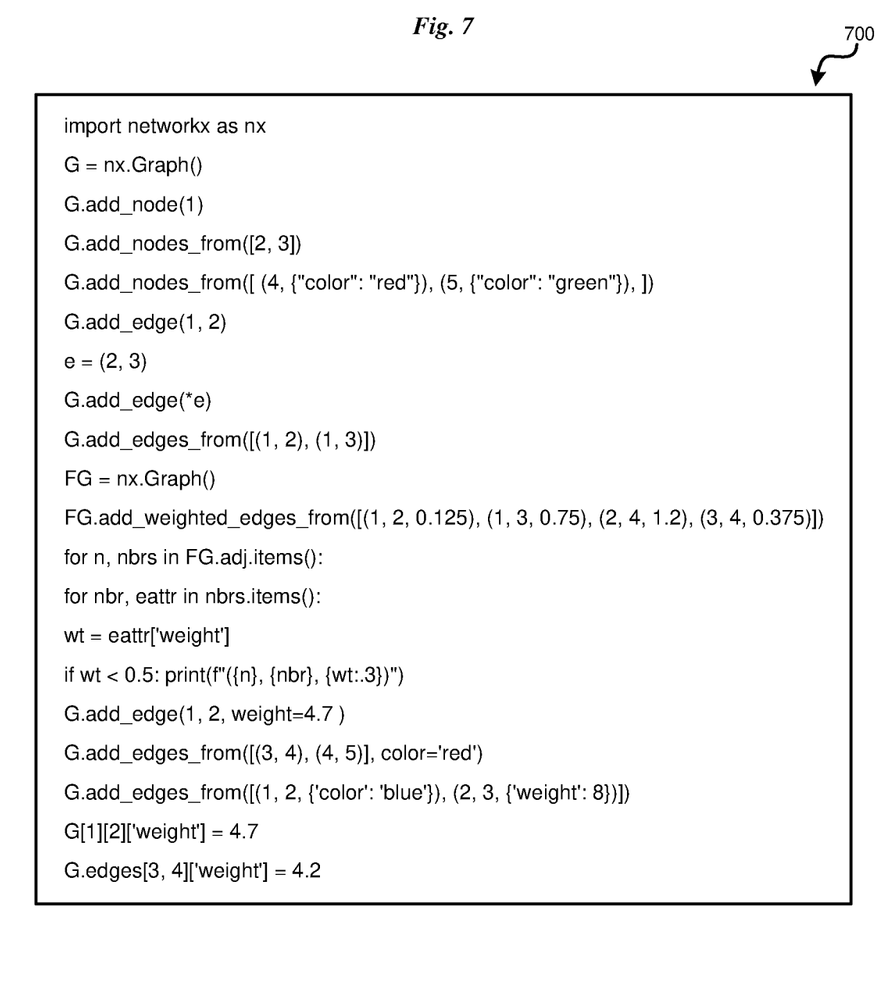
FIG. 7 depicts an example of data used to create a hybrid relational graph in accordance with an illustrative embodiment.

In the illustrated embodiment, the method includes graph creation 212 for available cloud services. Step 212 of the method corresponds to FIGS. 7 and 8. The steps for creating a knowledge graph are illustrated in FIG. 5. The method includes creating a graph for each cloud service 502. Available cloud services may include, but are not limited to, International Business Machine (IBM®) Cloud, Amazon Web Services® (AWS), Azure®, Google Cloud Platform (GCP®), and other public cloud services. (IBM, Amazon Web Services, Azure, and GCP are trademarks owned by their respective owners in the United States and other countries). The cloud graphs will be connected together based on similarity of scores of the services 504. An example of a cloud graph is illustrated in FIG. 8A. The weights will be assigned 506 to each edge that illustrates the cost of changing services between clouds. The edges in the graph are the connecting lines between the nodes. The graph will then be traversed 508 to determine a recommended adapted reference architecture for the service. In FIG. 7, the data for traversing the graph 8A to graph 8B is illustrated. The system will create an adapted reference architecture document based on the traversed weighted graph.

In the illustrated embodiment, the method includes analysis of the adapted reference architecture 210. The system will compare the adapted reference architecture document with new implementations of the solutions. The system will periodically adapt the reference architecture document to reduce service incidents for new implementation. In various implementations, the system will identify portions of the solution to be modified to ensure that the solution is aligned with the adapted reference architecture document. In various embodiments, the system will provide multiple options for a user to select different services across cloud services.

Figure 3:
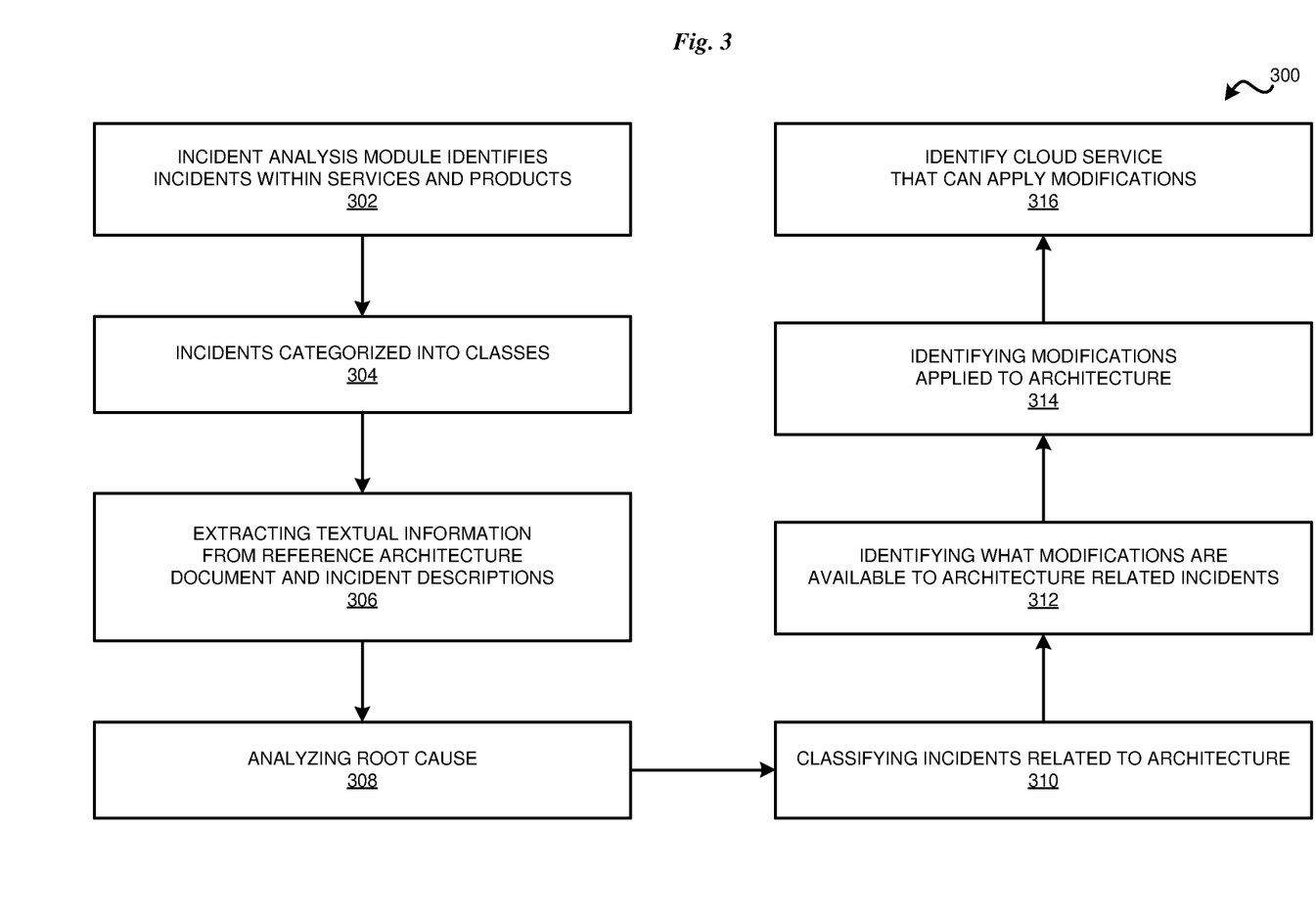
FIG. 3 depicts a flowchart of an example process for incident classification in accordance with an illustrative embodiment.

With reference to FIG. 3, this figure depicts a flowchart of an example process for incident classification in accordance with an illustrative embodiment. In the illustrated embodiment, the process 300 is performed as part of step 208 in FIG. 2.

In the illustrated embodiment, the process includes the incident analysis module identifying different types of events and service incidents 302 happening with IT products and IT based on the reference architecture document. The events and service incidents are categorized into different classes 304 such as, by non-limiting example, deletion of a component, adding a new component to the existing architecture, any change or modification in existing architecture, installation of new services/products, etc.

In the illustrated embodiment, the process includes extracting all textual information 306 from reference architectural documents and incident descriptions using NLP techniques. The system will include an English dictionary and corresponding domain specific language corpus to identify the context of the text.

In the illustrated embodiment, the process includes analyzing 308, by non-limiting example, the Root Cause, the RCA, the fixing detail of the service incidents. The process will also include classifying the service incidents which are related to architectural issue 310.

In the illustrated embodiment, the process includes identifying what modifications are available to fix the architectural related incidents 312. The process also includes identifying the solution and modifications 314 to be applied to the architecture. During this step, the system will use the knowledge repository corpus to identify which cloud service 316 can solve the problem.

Figure 4:
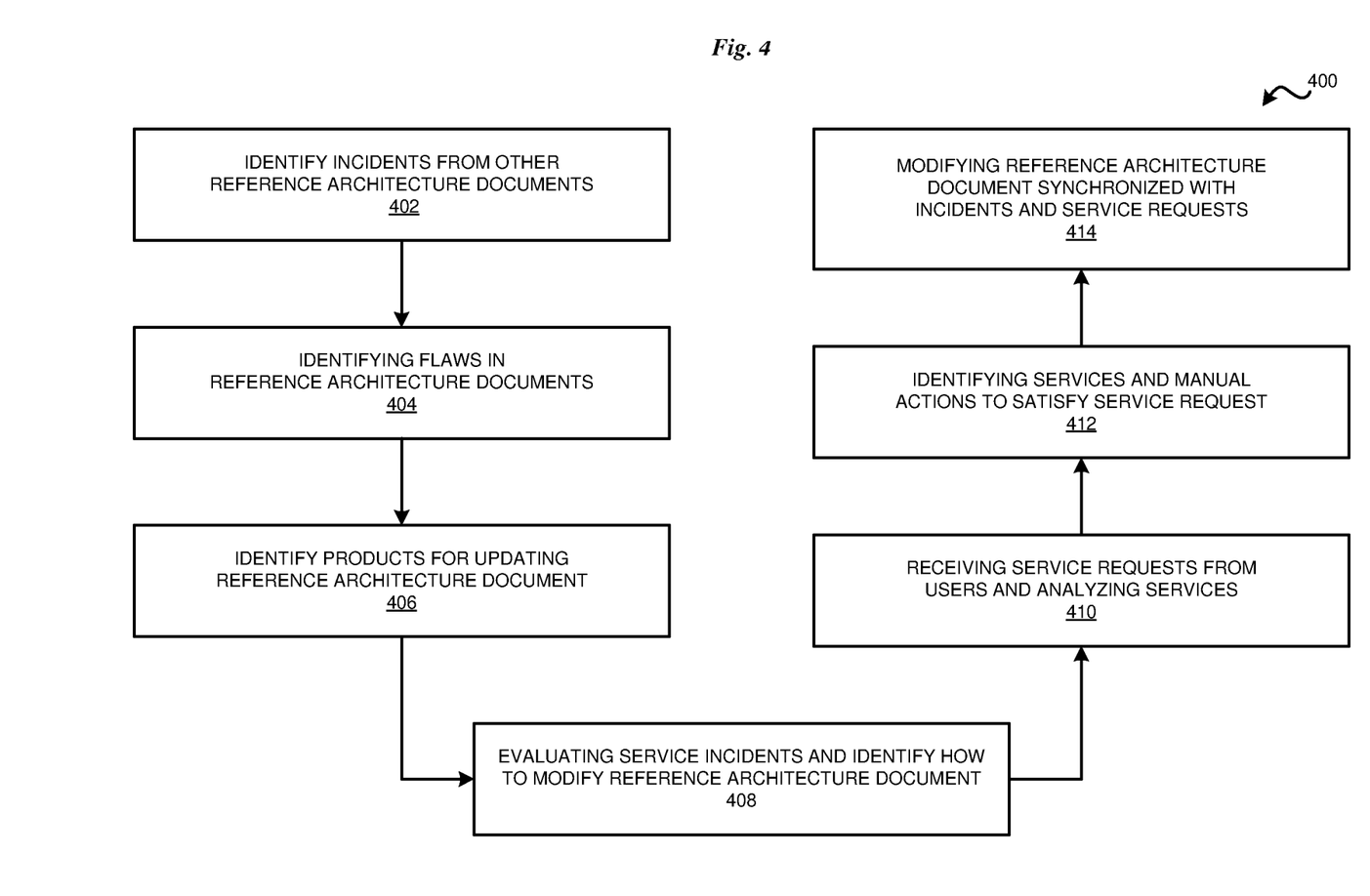
FIG. 4 depicts a flowchart of an example process for reference architecture document analysis and adaptation in accordance with an illustrative embodiment.

With reference to FIG. 4, this figure depicts a flowchart of an example process for reference architecture analysis and adaptation in accordance with an illustrative embodiment. In the illustrated embodiment, the process 400 is performed as part of step 210 in FIG. 2.

In the illustrated embodiment, the process will include identifying the types of incidents 402 from various implementations. The process also includes detecting the flaws 404 in the reference architecture document. The process also includes identifying appropriate IT products, IT services, integrations, security applications to use for updating 406 the reference architectural diagram. The process also includes continuously evaluating the service incidents and identifying how the reference architectural documents can be modified 408. The process also includes receiving the service requests from various business users and performing analysis of the services 410. The process also includes identifying what types of services and what manual actions are performed to satisfy the service request 412. The process also includes analyzing the knowledge repository corpus, to identify if any IT services or IT products are available to satisfy the service request 412. The process also includes automatically modifying the reference architecture document synchronized with the incidents and service requests 414.

With reference to FIG. 5, this figure depicts a flowchart of an example process for graph creation and traversal between clouds in accordance with an illustrative embodiment. In the illustrated embodiment, the process 500 is performed as part of step 212 in FIG. 2.

In the illustrated embodiment, the process includes creating a knowledge graph for available public cloud services 502. A graph will be created for each graph. The graphs will include nodes, edges, and labels as illustrated in FIG. 8 graphs A and B. The nodes will be the cloud services in the reference architecture document. The edges define relationships between the nodes. In other implementations, the nodes may be IT products or services within the architecture reference document. The process includes connecting graphs based on similarities of scores of services 504. The process also includes assigning weights to each edge to show the cost of changing services between clouds 506. The process also includes traversing 508 the graph to discover a recommended structure for an adapted architecture. In FIG. 7 an example of the data used to traverse the graph is illustrated. In FIG. 8, graph B is a traversal of graph A.

Figure 6:
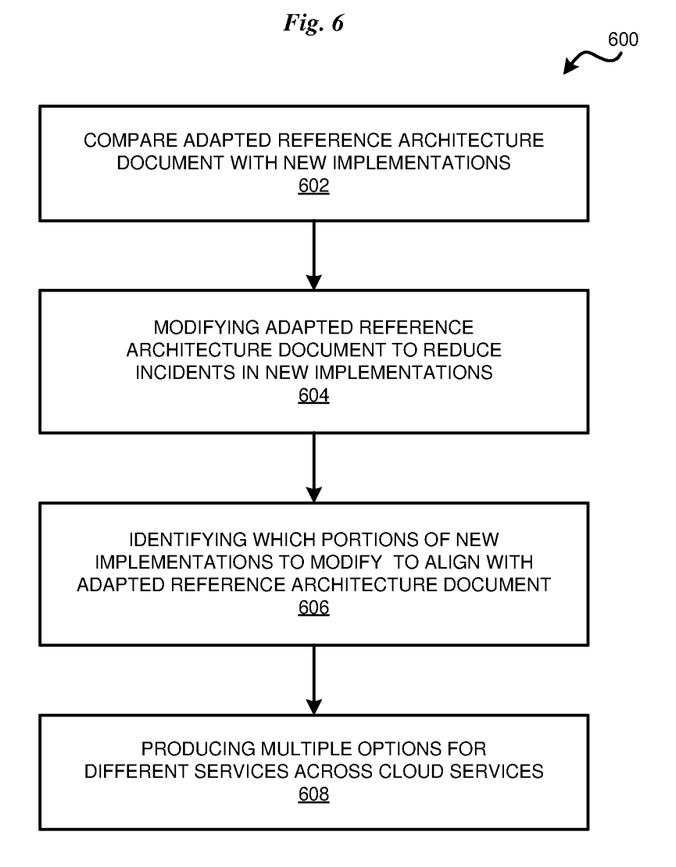
FIG. 6 depicts a flowchart of an example process for analysis of adapted architecture documents in accordance with an illustrative embodiment.

With reference to FIG. 6, this figure depicts a flowchart of an example process for analysis of an adapted reference architecture in accordance with an illustrative embodiment. In the illustrated embodiment, the process 600 is performed as part of step 214 in FIG. 2.

In the illustrated embodiment, the process includes comparing the adapted reference architecture document with the new implementations 602 of the IT products and services into a solution. The process also includes performing periodical modifications of the reference architecture document 604. This is being done to reduce service incidents for new implementations. The process also includes identifying which portion of the applications in the solution are to be modified to align the new implementation with the adapted reference architecture document 606. The process also includes providing multiple options for selecting different services across cloud services 608 to a user.

The following definitions and abbreviations are to be used for the interpretation of the claims and the specification. As used herein, the terms "comprises," "comprising," "includes," "including," "has," "having," "contains" or "containing," or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   loading a reference architecture document;
   populating a knowledge repository corpus wherein the knowledge repository corpus comprises data from information technology (IT) products, cloud services, and integrations, wherein the IT products, the cloud services, and the integrations are stored with metadata;
   detecting service incidents by the IT products;
   classifying, using an incident analysis module, the service incidents based on the reference architecture document;
   detecting flaws in the reference architecture document based on the classified service incidents;
   creating a weighted graph, using the knowledge repository and the classified service incidents, of the cloud services; and
   traversing the weighted graph and creating an adapted reference architecture document based on the traversed weighted graph.

2. The computer-implemented method of claim 1, wherein the reference architecture may include multiple cloud services.

3. The computer-implemented method of claim 1, wherein the reference architecture document may include one cloud service.

4. The computer-implemented method of claim 1, wherein the knowledge repository corpus comprises a record of the service incidents from a previous year.

5. The computer-implemented method of claim 1, wherein the knowledge repository is updated during an operation of a business.

6. The computer-implemented method of claim 1, further comprising computing cost, using a network flow optimization algorithm, of changing the reference architecture document to a different cloud service.

7. The computer-implemented method of claim 1, further comprising adding to the knowledge repository corpus with operational data.

8. The computer-implemented method of claim 1, further comprising receiving requests from a user to make changes to the reference architecture document.

9. The computer-implemented method of claim 1, further comprising:

analyzing a new service incident from a new business user;

identifying an IT product from which the new service incident was submitted; and recommending a change to be applied to the reference architecture document.

10. A computer program product comprising one or more computer readable storage media, and program instructions collectively stored on the one or more computer readable storage media, the program instructions executable by a processor to cause the processor to perform operations comprising:

loading a reference architecture document;

populating a knowledge repository corpus wherein the knowledge repository corpus comprises data from information technology (IT) products, cloud services, and integrations wherein the IT products, the cloud services, and the integrations are stored with metadata;

detecting service incidents by the IT products;

classifying, using an incident analysis module, the service incidents based on the reference architecture document;

detecting flaws in the reference architecture document based on the classified service incidents;

creating a weighted graph, using the knowledge repository corpus and the classified service incidents, of the cloud services; and traversing the weighted graph and creating an adapted reference architecture document based on the traversed weighted graph.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

computing cost, using a network flow optimization algorithm, of changing the reference architecture document to a different cloud service.

13. The computer program product of claim 10, wherein the reference architecture may include multiple cloud services.

14. The computer program product claim 10, wherein the reference architecture may include one cloud service.

15. The computer program product claim 14, wherein the knowledge repository is updated during an operation of a business.

16. The computer program product claim 15, further comprising adding to the knowledge repository corpus with operational data.

17. A computer system comprising a processor and one or more computer readable storage media, and program instructions collectively stored on the one or more computer readable storage media, the program instructions executable by the processor to cause the processor to perform operations comprising:

loading a reference architecture documents;

populating a knowledge repository corpus wherein the knowledge repository corpus comprises data from (information technology) IT products, cloud services, and integrations wherein the information technology (IT) products, the cloud services, and the integrations are stored with metadata;

detecting service incidents by the different IT products/services;

classifying, using an incident analysis module, the service incidents based on the reference architecture document;

detecting flaws in the reference architecture document based on the classified service incidents;

creating a weighted graph, using the knowledge repository and classified service incidents, of the cloud services; and traversing the weighted graph and creating an adapted reference architecture document based on the traversed weighted graph.

18. The computer system of claim 17, wherein the reference architecture may include multiple cloud services.

19. The computer system of claim 17, wherein the knowledge repository corpus comprises a record of the service incidents from a previous year.

20. The computer system of claim 17, computing cost, using a network flow optimization algorithm, of changing the reference architecture document to a different cloud service, further comprising adding to knowledge repository corpus with operational data.

* * * * *